United States Patent
Oh et al.

(10) Patent No.: US 8,380,713 B2
(45) Date of Patent: Feb. 19, 2013

(54) APPARATUS FOR QUESTION ANSWERING BASED ON ANSWER TRUSTWORTHINESS AND METHOD THEREOF

(75) Inventors: Hyo-Jung Oh, Daejeon (KR); Chung-Hee Lee, Daejeon (KR); Soo-Jong Lim, Daejeon (KR); Jeong Heo, Daejeon (KR); Hyun-Ki Kim, Daejeon (KR); Mi-Ran Choi, Daejeon (KR); Yeo-Chan Yoon, Seoul (KR); Chang-Ki Lee, Daejeon (KR); Yi-Gyu Hwang, Daejeon (KR); Myung-Gil Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 258 days.

(21) Appl. No.: 12/814,220

(22) Filed: Jun. 11, 2010

(65) Prior Publication Data

US 2011/0087656 A1 Apr. 14, 2011

(30) Foreign Application Priority Data

Oct. 13, 2009 (KR) ........................ 10-2009-0097306

(51) Int. Cl.
*G06F 17/30* (2006.01)

(52) U.S. Cl. ........ 707/728; 707/601; 707/673; 707/696; 707/711; 707/715; 707/694; 707/727; 707/729; 707/730; 707/731; 726/14; 715/200; 715/209; 715/234; 715/242

(58) Field of Classification Search .................. 707/600, 707/673, 696, 711, 715, 694, 727–731; 726/14; 715/200, 209, 234, 242

See application file for complete search history.

(56) References Cited

U.S. PATENT DOCUMENTS

| 7,216,361 | B1 * | 5/2007 | Roskind et al. | 726/9 |
|---|---|---|---|---|
| 7,908,644 | B2 * | 3/2011 | Roskind et al. | 726/3 |
| 2007/0061297 | A1 * | 3/2007 | Bihun et al. | 707/3 |

(Continued)

FOREIGN PATENT DOCUMENTS

| EP | 1777633 A3 | 12/2007 |
|---|---|---|
| KR | 10-2006-0135820 A | 12/2006 |

(Continued)

OTHER PUBLICATIONS

Zhu et al., "Incorporating Quality Metrics in Centralized/Distributed Information Retrieval on the World Wide Web", Department of Electrical Engineering and Computer Science, University of Kansas, Jul. 2000.

(Continued)

*Primary Examiner* — Frantz Coby
(74) *Attorney, Agent, or Firm* — Kile Park Goekjian Reed & McManus PLLC (57) ABSTRACT

Provides is an apparatus for question answering based on answer trustworthiness including: an answer indexer that indexes documents of which document trustworthiness satisfying a threshold value among documents included in a document collection and stores it in a knowledge Bases; an answer candidate extractor that extracts answer candidate documents for a user's question from the knowledge Bases; an answer source trustworthiness measurement unit; an answer extraction strategy trustworthiness measurement unit; and a trustworthiness integrator that generates an answer candidate trustworthiness list by ranking the answer candidate documents on the basis of the document trustworthiness, the source trustworthiness, and the extraction strategy trustworthiness of the answer candidate documents.

18 Claims, 4 Drawing Sheets

U.S. PATENT DOCUMENTS

| | | | |
|---|---|---|---|
| 2007/0192588 A1* | 8/2007 | Roskind et al. | 713/155 |
| 2007/0208727 A1* | 9/2007 | Saklikar et al. | 707/4 |
| 2007/0209069 A1* | 9/2007 | Saklikar et al. | 726/14 |

FOREIGN PATENT DOCUMENTS

| | | | |
|---|---|---|---|
| KR | 10-2007-0084579 A | | 8/2007 |
| KR | 10-2009-0021230 A | | 2/2009 |
| WO | 2005/089291 A2 | | 9/2005 |
| WO | 2006/050278 A2 | | 5/2006 |
| WO | WO 2008088607 A1 * | | 7/2008 |

OTHER PUBLICATIONS

Jeon et al., "A Framework to Predict the Quality of Answers with NonTextual Features", Proceedings of the 29th annual international ACM SIGIR conference on Research and development in information retrieval, Aug. 2006.

* cited by examiner

| <High-quality Doument> | <Low-quality Document> |
|---|---|
| StarCraft is a military science fiction real-time strategy video game developed by Blizzard Entertainment. The first game of the StarCraft series was released for Microsoft Windows on 31 March 1998. With more than nine million copies sold worldwide as of 21 May 2007, it is one of the best-selling games for the personal computer. A Mac OS version was released in March 1999, and a Nintendo 64 adaptation co-developed with Mass Media Interactive Entertainment was released on 13 june 2000. With its storyline adapted and expanded through a series of novels, StarCraft has three expansion packs available and a sequel in development (http://en.wikipedia.org/wiki/StarCraft) | ur not a starcraft fan!!?? Oh ma Gaad!! iam gonna Force Lightning U!! bbzzzzzzzzzz!! heheheheeeeeeeeeee!! Bwahahahaaaaa!! RTS on consoles, so sorrt u had to play this game.<br>Even more sorry that u had to play it on a console! *cant control* Blahahahwaaaamwauahahaaaahee eheheeeeeeeee!!!<br><br>Hunters. GEEEEEEEEEEEEEEEGEEEE EEEEEEEEEEEEEEEEEEEEE EEEEEEEeeeeeee<br><br>(http://www.actiontrip.com/reico mments_news.phtml?id=012608_3) |

(a)  (b)

FIG. 4

APPARATUS FOR QUESTION ANSWERING BASED ON ANSWER TRUSTWORTHINESS AND METHOD THEREOF

RELATED APPLICATIONS

The present application claims priority to Korean Patent Application Serial Number 10-2009-0097306, filed on Oct. 13, 2009, the entirety of which is hereby incorporated by reference.

BACKGROUND OF THE INVENTION

1. Field of the Invention

The present invention relates to an apparatus for question answering based on answer trustworthiness and a method thereof. More particularly, the present invention relates to an apparatus for question answering used for ranking an answer by considering the trustworthiness of answer candidates in various aspects such as a quality, a source, an answer extracting strategy, etc., and a method thereof.

2. Description of the Related Art

The World Wide Web provides a large collection of interconnected information sources (formed by various formats including text, image, and media contents) relating to almost all imaginable subjects. With the growth of the web, a user's ability capable of searching the collection and identifying contents related to a predetermined subject becomes gradually important and a plurality of search service providers are currently provided in order to satisfy the necessity.

In general, the search service provider posts a web page and a user can transmit a question indicating what the user is interested in through the web page. The search service provider generally prepares the list of links to the web pages or sites considered to be related to the question in the form of a "search result" page and transmits it to the user.

Question answering generally involves the following steps.

First, previously prepared indexes or database of the web pages or sites are searched by using one or more search word extracted from the question and the list of hits (generally a target page or site identified to include the search word or be related to the question in another scheme, or reference for the target page or site) is prepared. Subsequently, the ranking for the hits is determined according to a predetermined criterion and the best result (according to the criterion) is disposed at the most conspicuous portion, for example, the top of the list.

The list of the hits of which the ranking is determined is generally transmitted to the user in the form of a "result" page (alternately, a series of interconnected pages) including the list of links of hit pages or sites. Other features such as a sponsor link or advertisement may also be included in the result page.

The determination of the ranking of the hits often serves as an important factor indicating whether the user's search is successful or unsuccessful. Occasionally, the question returns so many hits that it is impossible for the user to examine all the hits within a valid time. In the case where first several links which the user follows are not guided to relating contents, the relating contents may be provided in a much lower part of the list, but the user often abandons the search and the search service provider.

Therefore, in order to maximize a possibility in that the relating contents will be disposed at a conspicuous portion, the search service provider has developed more complicated page ranking determination criteria and methods. The methods include methods for extracting an answer for a question on the basis of the trustworthiness of a web page or web text.

In one method for extracting the answer on the basis of the trustworthiness, user determination information for various pages or various sites is integrated to be reflected onto a text search system. Herein, the user determination information may include a determination from the user who asks a question and determinations from other users selected by the user who asks the question from members of his 'trust network'. In addition, the user may configure the trust network from social network data indicating the relationships between other users and the user. Since the above-mentioned algorithm, as a method for measuring the trustworthiness of the text by using text relatedness evaluation results of the users included in the trust network and improving the search performance on the basis of the measured trustworthiness, uses users' manual operation results at the time of evaluating the text trustworthiness, it is very high in accuracy. However, the algorithm has a disadvantage in that it takes a lot of effort and too much time.

In addition, another method for extracting the answer on the basis of the trustworthiness proposes an access method in which a similarity based appropriateness ranking is combined for quality ranking under a centralized and distributed text search environment of the text search. Six quality evaluation features used herein include currency, availability, information-to-noise ratio, authority, popularity, and cohesiveness. In the centralized search, a search effect using currency, availability, information-to-noise ratio, and page cohesiveness metrics is remarkably improved and in selection the site, the availability, the information-to-noise ratio, the popularity, and the cohesiveness metrics have an important role in improving the performance. In information fusion, the popularity metric has an important role. Accordingly, using the quality evaluation features help improving the performance in both the centralized and distributed text searches. Since the algorithm is the method for increasing the search performance by just measuring the trustworthiness of the text source, the algorithm is limitative in improving the search performance.

In addition, yet another method for extracting the answer on the basis of the trustworthiness proposes a framework for using non-textural features such as click count in order to measure a textual quality. This method measures the trustworthiness of the answer by using thirteen non-textual features such as click count, answer adaptation rate, the length of the answer, etc. in order to improve the performance of a community-based question answering service and helps an experimental result and improvement of the performance.

However, in the above-mentioned known methods, evaluation of the textural trustworthiness by the manual operation is just used, only the text trustworthiness is automatically calculated and used, or only the non-textual features such as the click count, the answer adaptation rate, etc. are used. That is, since the known methods are based on the relatedness between a keyword of a question inputted by the user and a text keyword, the trustworthiness of the answer itself is not considered.

SUMMARY OF THE INVENTION

The present invention is contrived to solve the above-mentioned problems and an object of the present invention is to provide a trustworthy answer to a user by evaluating the trustworthiness of answer candidates for a user's question in various aspects such as a quality of a document, a source, an answer extraction strategy, etc., integrating and scoring them to reflect it to an answer ranking.

An apparatus for question answering based on answer trustworthiness according to an embodiment of the present invention includes: an answer indexer that indexes documents of which document trustworthiness satisfying a threshold value among documents included in a document collection and stores it in a knowledge Bases; an answer candidate extractor that extracts answer candidate documents for a user's question from the knowledge Bases; an answer source trustworthiness measurement unit that analyzes non-textual features of the answer candidate documents extracted by the answer candidate extractor and measures source trustworthiness for each answer candidate document; an answer extraction strategy trustworthiness measurement unit that analyzes the appropriateness of an extraction strategy of the answer candidate documents extracted by the correct answer candidate extractor and measures the extraction strategy trustworthiness for each answer candidate document; and a trustworthiness integrator that generates an answer candidate trustworthiness list by ranking the answer candidate documents on the basis of the document trustworthiness, the source trustworthiness, and the extraction strategy trustworthiness of the answer candidate documents.

In particular, the apparatus further includes a document trustworthiness measurement unit that analyzes the textual features of the documents included in the documents collection and measures the document trustworthiness for each document.

Further, the textual feature includes at least one of an informativeness feature and a readability feature of the document included in the document collection.

In addition, the informativeness feature includes at least one of the length of the document, the number of words, an attachment file or not, and a description term.

Moreover, the readability feature includes at least one of lexical density, the appearance frequency of Internet terms, the appearance frequency of obscenities, and the appearance frequency of informal terms.

The correct answer indexer processes documents filtered out spams and duplication documents. The answer source trustworthiness measurement unit measures the relationship between the source of the corresponding answer candidate document and the user's question and the source trustworthiness for each answer candidate document by using the source trustworthiness of the corresponding answer candidate document.

The non-textual feature includes at least one of a source trustworthiness feature of the answer candidate document and a reputation feature of the answer candidate document.

The source trustworthiness feature of the answer candidate document is the relatedness between the source of the answer candidate document and the user's question.

The reputation feature of the answer candidate document includes at least one of a document generation time, the number of replies, the number of feedbacks, and the number of user's recommendations.

The answer extraction strategy trustworthiness measurement unit measures the extraction strategy trustworthiness for the answer candidate document by using the appropriateness between the user's question and the extraction strategy of the corresponding answer candidate document.

The apparatus further includes an answer manager that re-ranks the extracted answer candidate document on the basis of the answer candidate trustworthiness list and provides it to a user.

Meanwhile, a method for question answering based on answer trustworthiness according to another embodiment of the present invention includes: indexing documents of which document trustworthiness satisfying a threshold value among documents included in a document collection and storing it in a storage means; extracting answer candidate documents for a user's question from the storage means; analyzing non-textual features of the extracted answer candidate documents and measuring source trustworthiness for each answer candidate document; analyzing the appropriateness of an extraction strategy of the extracted answer candidate documents and measuring the extraction strategy trustworthiness for each answer candidate document; and generating an answer candidate trustworthiness list by ranking the answer candidate documents on the basis of the document trustworthiness, the source trustworthiness, and the extraction strategy trustworthiness of the answer candidate documents.

In particular, the method further includes analyzing the textual features of the documents included in the document collection and measuring the document trustworthiness for each document.

Further, the textual feature includes at least one of an informativeness feature and a readability feature of the document included in the document collection.

In addition, the informativeness feature includes at least one of the length of the document, the number of words, an attachment file or not, and a description term.

Moreover, the readability feature includes at least one of lexical density, the appearance frequency of Internet terms, the appearance frequency of obscenities, and the appearance frequency of informal terms.

The indexing documents of which document trustworthiness satisfying a threshold value among documents included in a document collection and storing it in a storage means processes documents filtered out spams and duplication documents.

The measuring the source trustworthiness for the answer candidate document measures the relatedness between the source of the corresponding answer candidate document and the user's question and the source trustworthiness for each answer candidate document by using the source trustworthiness of the corresponding answer candidate document.

The measuring the extraction strategy trustworthiness for the answer candidate document measures the extraction strategy trustworthiness for the answer candidate document by using the appropriateness between the user's question and the extraction strategy of the corresponding answer candidate document.

According to an embodiment of the present invention, the following effects are provided.

Apart from a method for selecting an answer candidate on the basis of only the existing relatedness between question and answer candidates, it is possible to propose an answer with higher trustworthiness to a user by evaluating the trustworthiness of answer candidates for a user's question in various aspects such as a quality of a document, a source, an answer extraction strategy, etc., integrating and scoring them to reflect it to an answer ranking.

In addition, by excluding a document with low trustworthiness during an indexing process, it is possible to save a cost and a time consumed to analyze and store an unnecessary document and by reducing the number of search target documents while extracting the answer, thus, it is possible to improve a search speed.

DETAILED DESCRIPTION OF THE PREFERRED EMBODIMENTS

Hereinafter, the present invention will be described in detail with reference to the accompanying drawings. Herein, the detailed description of a known function and configuration that may make the purpose of the present invention unnecessarily ambiguous in describing the spirit of the present invention will be omitted. Exemplary embodiments of the present invention are provided so that those skilled in the art may more completely understand the present invention. Accordingly, the shape, the size, etc., of elements in the figures may be exaggerated for a more clear description.

Figure 1:
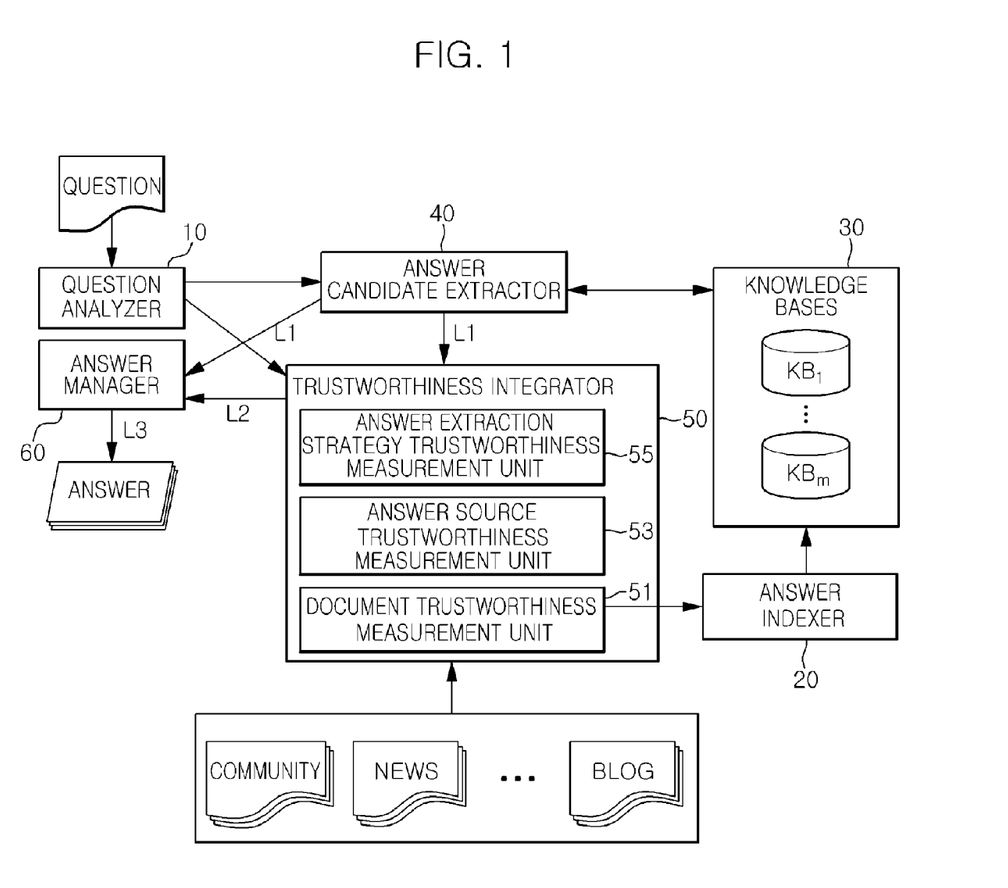
FIG. 1 is a block diagram for describing an apparatus for question answering based on answer trustworthiness.
Figure 2:
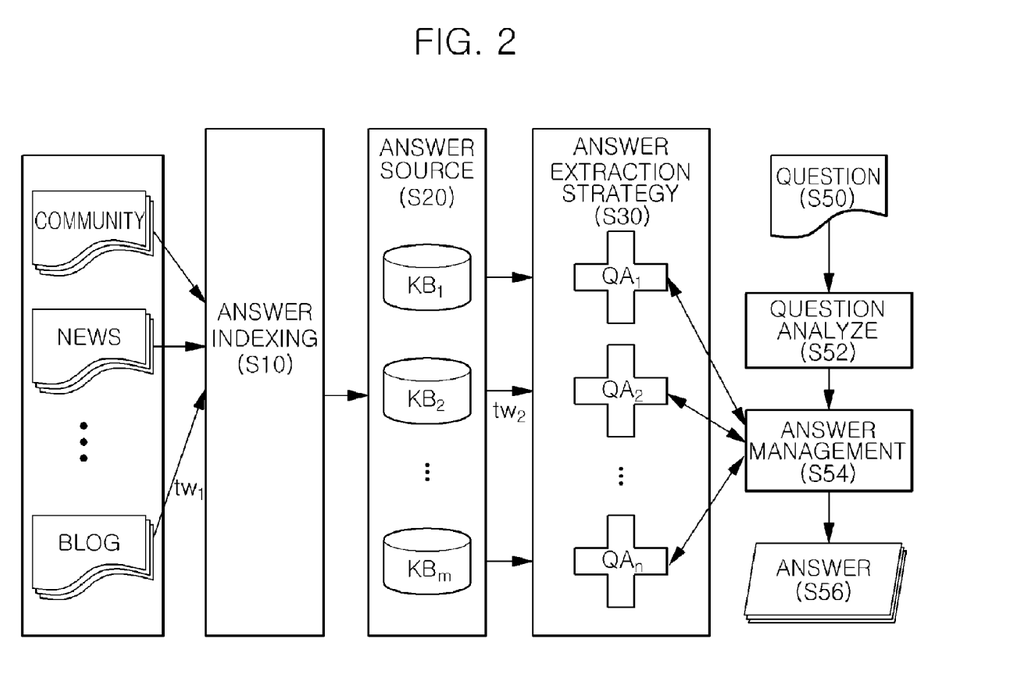
FIG. 2 is a diagram for describing a process in which each trustworthiness is integrated in a trustworthiness integrator of FIG. 1.

FIG. 1 is a block diagram for describing an apparatus for question answering based on answer trustworthiness. FIG. 2 is a diagram for describing a process in which each trustworthiness is integrated in a trustworthiness integrator of FIG. 1.

Referring to FIGS. 1 and 2, the apparatus for question answering based on answer trustworthiness according to the embodiment of the present invention includes a question analyzer 10, an answer indexer 20, a knowledge Bases 30, an answer candidate extractor 40, a trustworthiness integrator 50, and an answer manager 60.

The question analyzer 10 receives a question from a user (S50) and determines a subject and an intention of the question (S52). For example, with respect to a question that "how is the level of the Starcraft game elevated?" inputted from the user, the question analyzer 10 determines that the subject of the corresponding question relates to 'a Starcraft game' and the intention of the corresponding question relates to 'a method for elevating a level in the Starcraft game'.

In addition, the question analyzer 10 transfers a result of determining a user's question to the answer candidate extractor 40 and the trustworthiness integrator 50.

The correct indexer 20 indexes documents of which document trustworthiness satisfies a threshold value among documents included in a document collection and stores them in the knowledge Bases 30 (S10). At this time, the answer indexer 20 indexes documents other than a spam document and a duplicate document among the documents included in the document collection. The documents included in the document collection to be searched include all documents disclosed in a community, news, a blog, an encyclopedia, an e-book, etc.

In the answer indexer 20, by indexing documents other than documents that do not satisfy the threshold value depending on the document trustworthiness during the indexing process, it is possible to save a cost and a time consumed to analyze and store an unneeded document and by reducing the number of documents to be searched while extracting the answer, thus, it is possible to improve a search speed.

The answer candidate extractor 40 extracts answer candidate documents L1 for the user's question from the knowledge Bases 30 on the basis of data transferred from the question analyzer 10.

The trustworthiness integrator 50 generates an answer candidate trustworthiness list L2 by ranking the answer candidate documents on the basis of document trustworthiness, source trustworthiness, and extraction strategy trustworthiness of the answer candidate documents L1 extracted by the answer candidate extractor 40.

For this, the trustworthiness integrator 50 includes a document trustworthiness measurement unit 51, an answer source trustworthiness measurement unit 53, and an answer extraction trustworthiness measurement unit 55.

The document trustworthiness measurement unit 51 analyzes textual features of the documents included in the document collection and measures the document trustworthiness for each document. Herein, the document trustworthiness is a value acquired by measuring how good the readability of the corresponding document is and the document trustworthiness is synthetically determined by duplication or not of a target document, a spam or not, and a trustworthiness value of the target document in the document collection.

In the document trustworthiness measurement unit 51, in the case where the duplication document is provided in the document collection, only the original document is left and the rest documents are removed or the duplication document is removed during the indexing process in the answer indexer 20 by granting a low weight at the time of granting the trustworthiness. Likewise, in the document trustworthiness measurement unit 51, in the case where the spam document is provided in the document collection, the spam document is treated as a document having no informative value and removed or the spam document is removed during the indexing process in the answer indexer 20 by granting a low weight at the time of granting the weight.

Figure 3:
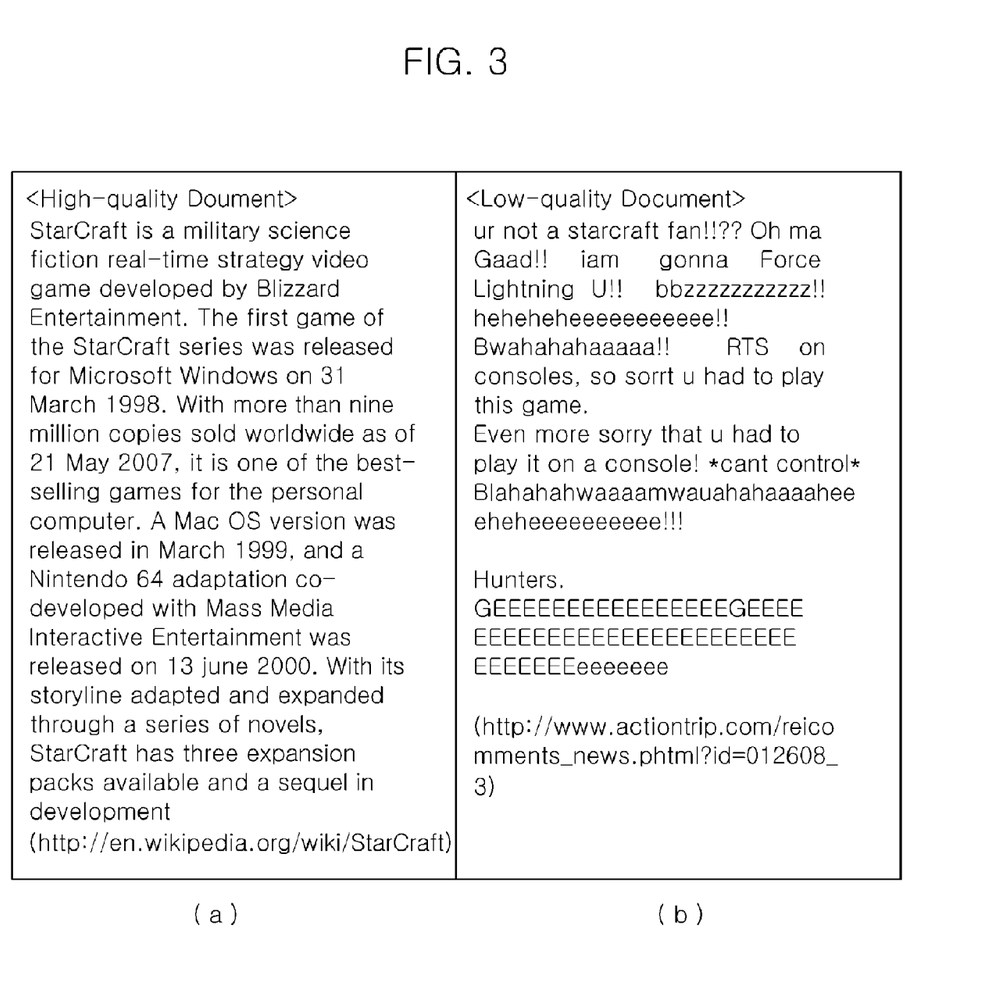
FIG. 3 is an exemplary diagram for comparing a document having high document trustworthiness and a document having low document trustworthiness with each other and describing them.

FIG. 3 is an exemplary diagram for comparing a document having high document trustworthiness and a document having low document trustworthiness with each other and describing them. Referring to FIG. 3, since an outline of 'Starcraft', production features, etc. are described as a formal text in a text of FIG. 3(a), the text is good in readability, while since a text of FIG. 3(b) is described by Internet terms such as an emoticon, an abbreviation, etc., the text is bad in readability.

The textual features for measuring the document trustworthiness in the document trustworthiness measurement unit 51 may include an informativeness feature and a readability feature and the features described herein may, of course, be added or changed depending on an application domain.

The informativeness feature may include the length of the document, the number of words, an attached file or not, a description term, etc. In general, if the length of the document is long, the number of words included in the document is many (described by various words), the number of attached files (auxiliary attached s such as an image, a text, and a video) attached in the document is many, and the description term is a document formed by the formal text, the document is good in informativeness.

In addition, the readability feature may include lexical density, the appearance frequency of the Internet terms (emoticon, abbreviation, etc.), the appearance frequency of obscenities, and the appearance frequency of informal terms. In general, if the disclosed Internet terms, obscenities, informal terms, etc. are many, the readability is deteriorated.

The answer source trustworthiness measurement unit 53 analyzes the non-textual features of the answer candidate documents extracted by the answer candidate extractor 40 to measure the source trustworthiness for each answer candidate document (S20).

More specifically, the answer source trustworthiness measurement unit 53 measures the relatedness between the source of the corresponding answer candidate document and the user's question and the source trustworthiness for each answer candidate document by using the source trustworthiness of the corresponding answer candidate document.

The non-textual feature may include a source trustworthiness feature of the answer candidate document and a reputation feature of the answer candidate document. Herein, the source trustworthiness feature of the answer candidate document may include the relatedness between the source of the answer candidate document and the user's question. In addition, the reputation feature of the answer candidate document may include a document generation time, the number of replies, the number of feedbacks such as RSS feed, and the number of user recommendations. In general, as the document generation time is recent, the trustworthiness is better and as the number of user replies for predetermined notice writing increases, the notice writing is a document popular to users.

For example, in the case where any user inputs a question relating to a method for elevating a level in the 'Starcraft', in case of an answer for the question, a writing of which the number of recommendations is the largest on a web board (→ web board) site prepared by the users who play the 'Starcraft' or a writing prepared by a person who has a good reputation may be the most trustworthy answer candidate. On the contrary, in the case where the user wants to know a principle of a predetermined natural phenomenon, it is more effective that the user extracts and proposes the answer candidate from the sources such as an encyclopedia site or the e-book rather than a predetermined web board.

The answer extraction strategy trustworthiness measurement unit 55 analyzes the appropriateness of the extraction strategy of the answer candidate documents extracted by the answer candidate extractor 40 to measure the extraction strategy trustworthiness for each answer candidate document (S30). Herein, the extraction strategy trustworthiness is a value measuring how appropriate the extraction strategy is while extracting the answer candidate document for the user's question in the answer candidate extractor 40. The 'extraction strategy' means a method for extracting the answer in a previously constructed database, a method for extracting the answer from a general natural word sentence, a method for extracting information from structured information (i.e., table) discriminated by a predetermined tag in an HTML text, etc. and the extraction strategy is determined depending on the user's question.

For example, in order to process a question asking an exchange rate on a predetermined data, a strategy of extracting the answer candidate document from a database storing foreign exchange information is selected and in order to determine a predetermined accident, a strategy of extracting the answer from a document described by the natural word sentence such as a newspaper article.

Further, in the case where the user questions "what are nations corresponding to G7?", it is advantageous to select a strategy of extracting one document including national information corresponding to 'G7' as the answer candidate document rather than a method of partially extracting and combining the national information corresponding to 'G7' from various different databases or documents and proposing it to the user. The 'extraction strategy' may be updated whenever various sub answer extraction methods integrated into an entire question answering system are added.

The trustworthiness integrator 50 generates the answer candidate trustworthiness list L2 by ranking the answer candidate documents on the basis of document trustworthiness, source trustworthiness, and extraction strategy trustworthiness of the answer candidate documents extracted by the document trustworthiness measurement unit 51, the answer source trustworthiness measurement unit 53, and the answer extraction strategy trustworthiness measurement unit 55 (S54).

More specifically, the trustworthiness integrator 50 ranks the answer candidate documents on the basis of the document trustworthiness, source trustworthiness, and extraction strategy trustworthiness of the answer candidate documents measured by Equation 1.

$$C(a, Q) = \sum_{i}^{N} w_i \times S(a, q_i) \times (\alpha tw_{1i} + \beta tw_{2i} + \gamma tw_{3i}),$$
$$\alpha + \beta + \gamma = 1$$
[Equation 1]

Herein, $w_i$ represents a weight for each answer candidate, $S(a, q_i)$ represents the semantic relatedness between a question and an answer candidate, and $tw_{(1\sim3)i}$ represents a trustworthiness value for each of steps (document trustworthiness, source trustworthiness, and extraction strategy trustworthiness). $\alpha$, $\beta$, and $\gamma$ as a constant parameter are determined as an optimal value depending on an experimental result.

According to a calculation result, finally, an answer $a^*$ shown in Equation 2 is proposed to the user.

$$a^* = arg\ max\ C(a,Q)$$
[Equation 2]

For reference, in the known question answering method, Equation 3 excluding the trustworthiness determination part is used.

$$C(a, Q) = \sum_{i}^{N} w_i \times S(a, q_i)$$
[Equation 3]

Lastly, the answer manager 60 provides a final answer list L3 to the user by re-ranking the answer candidate documents extracted based on the generated answer trustworthiness list L2 (S56).

Figure 4:
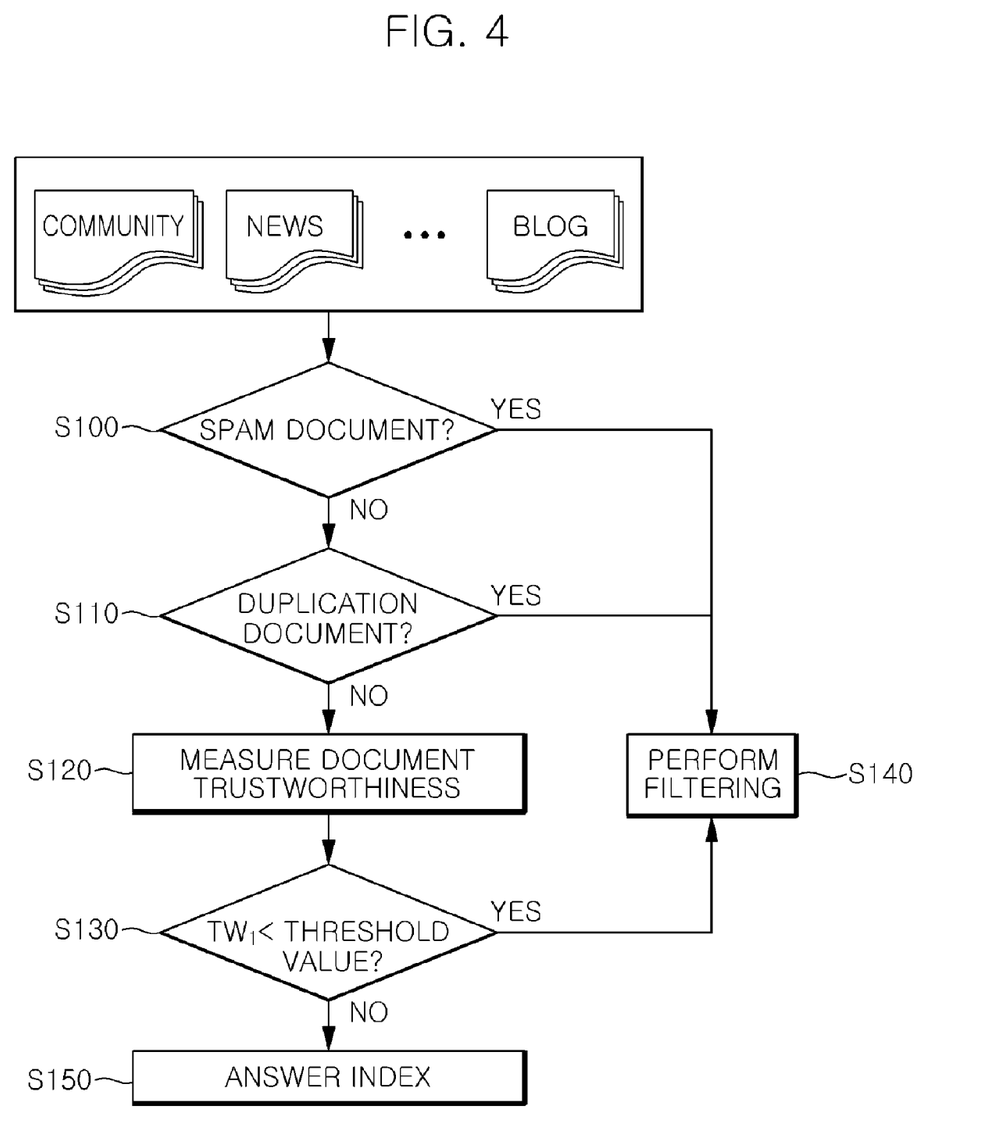
FIG. 4 is a flowchart for describing a method for indexing an answer on the basis of trustworthiness according to an embodiment of the present invention.

FIG. 4 is a flowchart for describing a method for indexing an answer on the basis of trustworthiness according to an embodiment of the present invention.

Referring to FIG. 4 it is determined whether or not a spam document is included in a corresponding document collection with respect to all document collections to be searched by including documents disclosed in a community, news, a blog, an encyclopedia, an e-book, etc. (S100).

According to the determination result at step S100, in the case where the spam document is provided in the corresponding document collection, the spam document is filtered (S140).

As a next step, it is determined whether or not a duplication document is included in the corresponding document collection (S110).

According to the determination result at step S110, in the case where the duplication document is included in the corresponding document collection, only an original document is left and duplicated documents are filtered (S140).

In addition, document trustworthiness is measured with respect to a document collection of which both the spam document and the duplication document are filtered through step S140 (S120). Measurement of the document trustworthiness at step S120 may be performed through the above-mentioned method.

According to the measurement result of the document trustworthiness of the corresponding documents, documents of which a document trustworthiness value tw1 does not satisfy a threshold value are filtered (S140) and documents of which the document trustworthiness value tw1 satisfies the threshold value are indexed (S150), and indexed documents are stored in a knowledge Bases. During the indexing process, by indexing documents other than documents of which the document trustworthiness value tw1 does not satisfy the threshold value depending on the document trustworthiness, it is possible to save a cost and a time consumed to analyze and store an unneeded document and by reducing the number of documents to be searched while extracting the answer, thus, it is possible to improve a search speed.

Meanwhile, in the above-mentioned description, filtering is performed by determining whether the duplication document or the spam document before the measurement step of the document trustworthiness. However, the spam document and the duplication document may be removed during the indexing process (S130) by granting a low weight at the time of granting trustworthiness at step S120.

As described above, the preferred embodiments have been described and illustrated in the drawings and the specification. Herein, specific terms have been used, but are just used for the purpose of describing the present invention and are not used for defining the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. An apparatus for question answering based on answer trustworthiness, comprising:
    a hardware processor configured to:
        analyze one or more textual features of documents included in a document collection and measure document trustworthiness for each of the documents based thereon;
        index documents of which document trustworthiness satisfying a threshold value among documents included in the document collection and stores the indexed documents in one or more knowledge Bases;
        extract answer candidate documents for a user's question from the one or more knowledge Bases;
        analyze one or more non-textual features of the extracted answer candidate documents and measure source trustworthiness for each extracted answer candidate document based thereon;
        analyze an appropriateness of an extraction strategy of the extracted answer candidate documents and measure extraction strategy trustworthiness for each extracted answer candidate document based thereon; and
        generate an answer candidate trustworthiness list by ranking the extracted answer candidate documents on the basis of document trustworthiness, source trustworthiness, and extraction strategy trustworthiness.

2. The apparatus for question answering on the basis of answer trustworthiness according to claim 1, wherein the one or more textual features include at least one of an informativeness feature or a readability feature of the document included in the document collection.

3. The apparatus for question answering on the basis of answer trustworthiness according to claim 2, wherein the informativeness feature includes at least one of a length of the document, a number of words, an attachment file or not, or a description term.

4. The apparatus for question answering on the basis of answer trustworthiness according to claim 2, wherein the readability feature includes at least one of lexical density, an appearance frequency of Internet terms, an appearance frequency of obscenities, or an appearance frequency of informal terms.

5. The apparatus for question answering on the basis of answer trustworthiness according to claim 1, wherein the hardware processor, when indexing documents, filters out spams and duplication documents.

6. The apparatus for question answering on the basis of answer trustworthiness according to claim 1, wherein the hardware processor measures a relationship between the source of the corresponding extracted answer candidate document and the user's question and the source trustworthiness for each extracted answer candidate document by using the source trustworthiness of the corresponding extracted answer candidate document.

7. The apparatus for question answering on the basis of answer trustworthiness according to claim 1, wherein the one or more non-textual features include at least one of a source trustworthiness feature of the extracted answer candidate document or a reputation feature of the extracted answer candidate document.

8. The apparatus for question answering on the basis of answer trustworthiness according to claim 7, wherein the source trustworthiness feature of the answer candidate document is a relatedness between the source of the extracted answer candidate document and the user's question.

9. The apparatus for question answering on the basis of answer trustworthiness according to claim 7, wherein the reputation feature of the extracted answer candidate document includes at least one of a document generation time, a number of replies, a number of feedbacks, or a number of user's recommendations.

10. The apparatus for question answering on the basis of answer trustworthiness according to claim 1, wherein the hardware processor measures the extraction strategy trustworthiness for the extracted answer candidate document by using an appropriateness between the user's question and the extraction strategy of the corresponding extracted answer candidate document.

11. The apparatus for question answering on the basis of answer trustworthiness according to claim 1, wherein the hardware processor is further configured to:
    re-rank the extracted answer candidate documents on the basis of the answer candidate trustworthiness list and provide a final answer list to a user based thereon.

12. A method for question answering based on answer trustworthiness, comprising:
    analyzing one or more textual features of documents included in a document collection and measuring document trustworthiness for each of the documents based thereon;
    indexing documents of which document trustworthiness satisfying a threshold value among documents included in the document collection and storing the indexed documents in a storage means;
    extracting answer candidate documents for a user's question from the storage means;
    analyzing one or more non-textual features of the extracted answer candidate documents and measuring source trustworthiness for each extracted answer candidate document based thereon;
    analyzing an appropriateness of an extraction strategy of the extracted answer candidate documents and measuring extraction strategy trustworthiness for each extracted answer candidate document based thereon; and generating, using a hardware processor, an answer candidate trustworthiness list by ranking the extracted answer candidate documents on the basis of document trustworthiness, source trustworthiness, and extraction strategy trustworthiness.

13. The method for question answering based on answer trustworthiness of claim 12, wherein the one or more textual features include at least one of an informativeness feature or a readability feature of the document included in the document collection.

14. The method for question answering based on answer trustworthiness of claim 13, wherein the informativeness feature includes at least one of a length of the document, a number of words, an attachment file or not, or a description term.

15. The method for question answering based on answer trustworthiness of claim 13, wherein the readability feature includes at least one of lexical density, an appearance frequency of Internet terms, an appearance frequency of obscenities, or an appearance frequency of informal terms.

16. The method for question answering based on answer trustworthiness of claim 12, wherein the indexing documents comprises filtering out spams and duplication documents.

17. The method for question answering based on answer trustworthiness of claim 12, wherein the measuring the source trustworthiness for the extracted answer candidate document comprises measuring a relatedness between the source of the corresponding extracted answer candidate document and the user's question and the source trustworthiness for each extracted answer candidate document by using the source trustworthiness of the corresponding extracted answer candidate document.

18. The method for question answering based on answer trustworthiness of claim 12, wherein the measuring the extraction strategy trustworthiness for the extracted answer candidate document comprises measuring the extraction strategy trustworthiness for the extracted answer candidate document by using an appropriateness between the user's question and the extraction strategy of the corresponding extracted answer candidate document.

* * * * *